US006325361B1

(12) United States Patent
Van Duijn

(10) Patent No.: US 6,325,361 B1
(45) Date of Patent: Dec. 4, 2001

(54) METHOD AND DEVICE FOR BRINGING A GAS AND A LIQUID INTO CONTACT WITH ONE ANOTHER

(76) Inventor: Albert Van Duijn, Bospad 24, NL-2374 Bt Oude Ade (NL)

( * ) Notice: Subject to any disclaimer, the term of this patent is extended or adjusted under 35 U.S.C. 154(b) by 0 days.

(21) Appl. No.: 09/308,898

(22) PCT Filed: Nov. 27, 1997

(86) PCT No.: PCT/NL97/00650

§ 371 Date: Jul. 26, 1999

§ 102(e) Date: Jul. 26, 1999

(87) PCT Pub. No.: WO98/23349

PCT Pub. Date: Jun. 4, 1998

(30) Foreign Application Priority Data

Nov. 27, 1996 (NL) ..................................... 1004630
May 29, 1997 (NL) ..................................... 1006152

(51) Int. Cl.[7] ..................................................... B01F 3/04
(52) U.S. Cl. ..................... 261/113; 261/114.3; 96/275; 96/299; 96/323; 96/326
(58) Field of Search ................................. 261/108, 112.1, 261/113, 114.3; 95/119, 204, 213, 218, 223, 224; 96/272, 273, 274, 275, 277, 296, 297, 299, 323, 326

(56) References Cited

U.S. PATENT DOCUMENTS

| 489,147 | * | 1/1893 | Golding | 261/114.3 |
|---|---|---|---|---|
| 764,049 | * | 7/1904 | Guldlin | 261/113 |
| 2,752,138 | * | 6/1956 | Kittel | 261/113 |
| 2,787,453 | * | 4/1957 | Hibshman et al. | 261/114.3 |
| 3,233,879 | | 2/1966 | Mitchell . | |
| 3,518,816 | * | 7/1970 | Jalma | 96/326 |
| 3,675,396 | * | 7/1972 | Hawryluk et al. | 261/114.3 |
| 3,807,143 | * | 4/1974 | Dunn | 96/277 |
| 3,830,706 | * | 8/1974 | Kogan . | |
| 4,351,652 | * | 9/1982 | Wisting | 96/326 |
| 5,192,466 | * | 3/1993 | Binkley | 261/114.3 |
| 5,480,595 | * | 1/1996 | Yeoman et al. | 261/114.3 |

FOREIGN PATENT DOCUMENTS

| 1800435 | 6/1969 | (DE) . | |
| 2422096 | 11/1975 | (DE) . | |
| 2298359 | 8/1976 | (FR) . | |
| 802306 | * 10/1958 | (GB) | 261/113 |
| WO 9504581 | 2/1995 | (WO) . | |

* cited by examiner

Primary Examiner—C. Scott Bushey
(74) Attorney, Agent, or Firm—Handal & Morofsky

(57) ABSTRACT

In order to bring a gas and a liquid into contact with one another, for example so as to exchange, remove or add components or calorific value present in the gas and/or liquid, the liquid is guided along one or more walls which are provided with small openings, and the gas is guided into the liquid, via these openings, by allowing this liquid to flow along the walls or by moving the walls along the liquid. In order to increase the contact time between gas and liquid, the gas is guided into the liquid in a direction which essentially corresponds to the direction of movement of the liquid with respect to the wall which is provided with openings. A venturi effect is generated in the region of the openings, since subatmospheric pressure is produced at the location where the openings open into the stream of liquid. If the walls are in the form of plates, use is preferably made, in order to separate the gas flow to be discharged from one another, of a water seal which is produced if the inclined plates which are provided with openings, alternate with closed, inclined plates, project into a reservoir of liquid.

13 Claims, 6 Drawing Sheets

METHOD AND DEVICE FOR BRINGING A GAS AND A LIQUID INTO CONTACT WITH ONE ANOTHER

A method of this kind is described in International Patent Application PCT/NL/94/00187, in the name of Leendert Aandewiel. The most significant advantage of this method is that gas and liquid can be mixed effectively using a low-pressure ventilator and a low-pressure liquid recirculation pump.

In the first instance, the invention relates to a method for bringing a gas and liquid into contact with one another, comprising moving a wall which is provided with openings an a liquid which is in contact with one side of this wall with respect to one another, gas flowing into the liquid via the said openings.

A first object of the invention is to improve the contact between the gas and the liquid by lengthening the contact time and increasing the contact area. For this purpose, the method is characterized by using the venturi-effect caused by motion of the liquid over one end of an opening in a wall to cause the gas which is positioned on the other end of the opening to pass into the liquid, forming elongated gas bubbles therein. Therefore, the gas on the other end of opening in the wall does not have to be at greater pressure than the surrounding atmosphere to cause contact with the liquid.

The gas bubbles will be in contact with the liquid for a longer period of time, since they break out at the surface of the stream of liquid less quickly.

The gas is guided into the stream of liquid at atmospheric pressure or at very slightly superatmospheric pressure, in virtually the same direction as the direction of flow of the stream of liquid, via the channels or diverter elements which are connected to the openings in the walls and which open entirely into the stream of liquid.

As a result of the venturi effect generated by the stream of liquid where the openings open out, the gas, which is at atmospheric pressure or at very slightly superatmospheric pressure, is entrained in the liquid and the gas pressure in the gas bubbles is virtually identical to the pressure in the surrounding liquid. This results in long thin gas bubbles extending in the direction of the stream of liquid.

These relatively long and thin gas bubbles have a relatively great contact area with the surrounding liquid and are entrained by the liquid over a relatively much longer distance than the expanding gas bubbles, which quickly break out at the surface of the liquid, which are formed if the gas is supplied at superatmospheric pressure.

A further improvement to the venturi effect can be achieved if the adhesion force between the liquid and the material from which the said channels or diverter elements are produced is reduced by the fact that at least the outflow openings of the said channels or diverter elements are produced from or covered with a hydrophobic, or at least non-hydrophilic, material.

According to the invention, the openings, on that side of the wall which is in contact with the liquid, are provided with projecting channels or diverter elements, which open into the liquid and are formed and directed in such a manner that if the liquid and the wall move with respect to one another a venturi effect is generated at the location where the channels or diverter elements open out, this effect leading to subatmospheric pressure at this location.

In a surprisingly simple and effective device, use is made, for the purpose of separating the gas stream which is supplied to the liquid and the gas stream which is discharged after passing through the liquid, of a so-called water seal, in which case, according to the invention, a number of inclined plates which are provided with openings and a number of closed, inclined plates are disposed alternately one behind the other, a side chamber is arranged on one or both sides of the said set of plates, which side chamber is connected at the top, via gas-supply openings, to the spaces beneath an inclined plate which is provided with openings and above a closed, inclined plate, and at the bottom is connected, via gas-discharge openings, to the spaces above an inclined plate which is provided with openings and beneath a closed, inclined plate, the gas-supply openings and the said gas-discharge openings furthermore being separated from one another by means of a partition arranged in the said chamber, and the inclined plates projecting, in the region of their bottom ends, into a space which during use is filled with liquid, so that a water seal can be formed.

Preferably, a gas-suction device is connected to that part of the chamber or chambers which is connected to the gas-discharge opening.

The liquid-supply means may comprise a channel which is arranged above the inclined plates and is connected, by means of openings, to the spaces above the inclined plates which are provided with openings. In order to recirculate the liquid, one or more pipes with pumps present therein may extend, from the liquid chamber into which the bottom edges of the inclined plates project, to the channel above the inclined plates.

In a variant of the above-described embodiment, the said projecting channels or diverter elements are arranged on the inside of the walls of one or more vertically disposed tubes which are situated between two tube plates, liquid flowing through the tubes during use.

In one embodiment which deviates rather from the abovementioned embodiments but nevertheless fulfils the principle of the invention, the projecting channels or diverter elements are arranged on the underside of a rotating disc which is in contact with liquid.

The method and device described can be used, inter alia, for:
  exchanging, removing or adding components and/or calorific energy present in the gas and/or the liquid,
  mixing or dissolving oxidizing or reducing gases into liquid,
  at elevated temperature of the liquid, evaporating the liquid or the components situated therein in the gas stream,
  at reduced temperature of the liquid, condensing the liquid or components evaporated in the gas stream out of the latter.

The invention will now be described in more detail with reference to the figures, which show a number of exemplary embodiments and in which.

Figure 1:
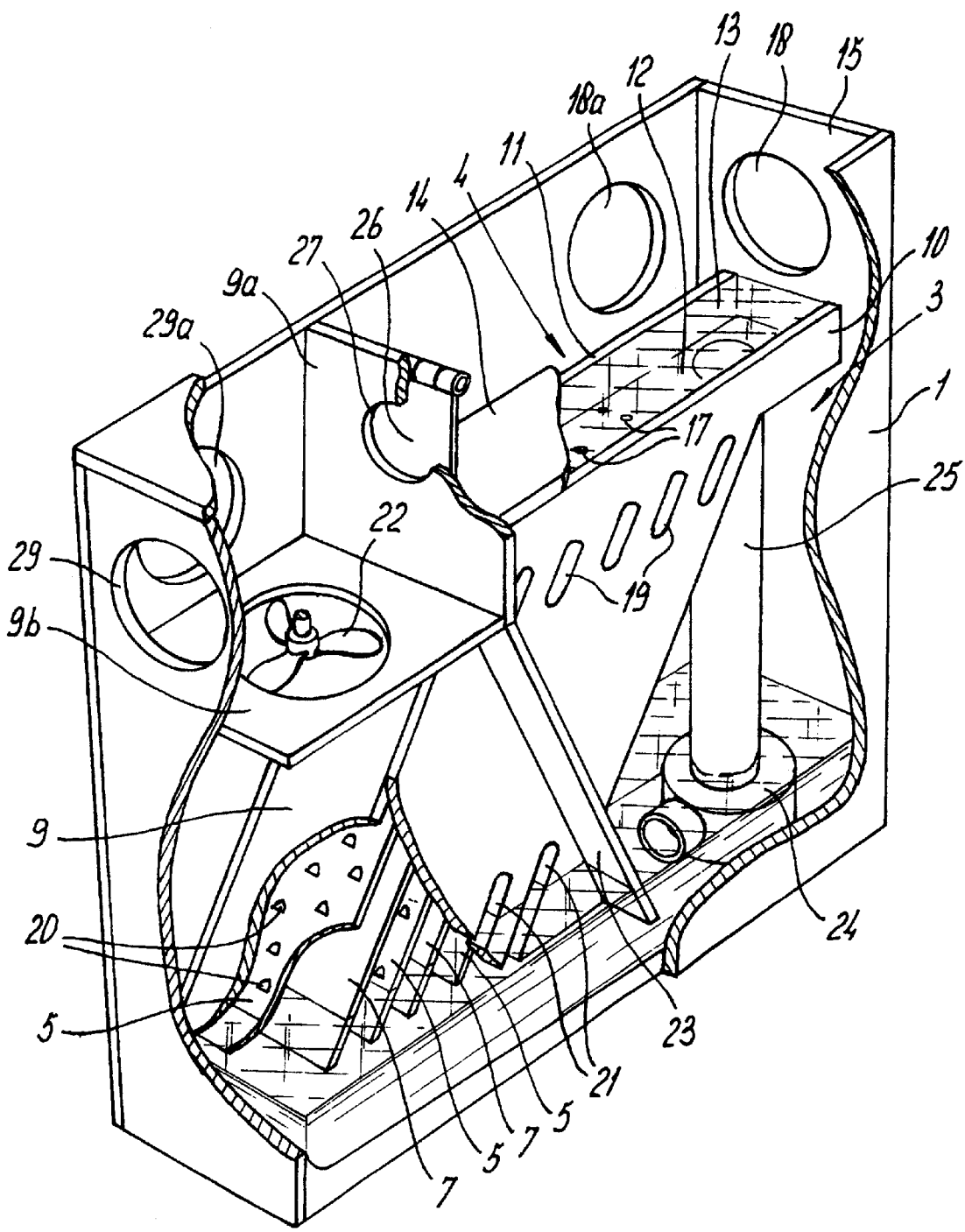
FIG. 1 shows a perspective view of an embodiment of the device of the invention, in which certain parts are shown cut away for the sake of clarity.
Figure 2:
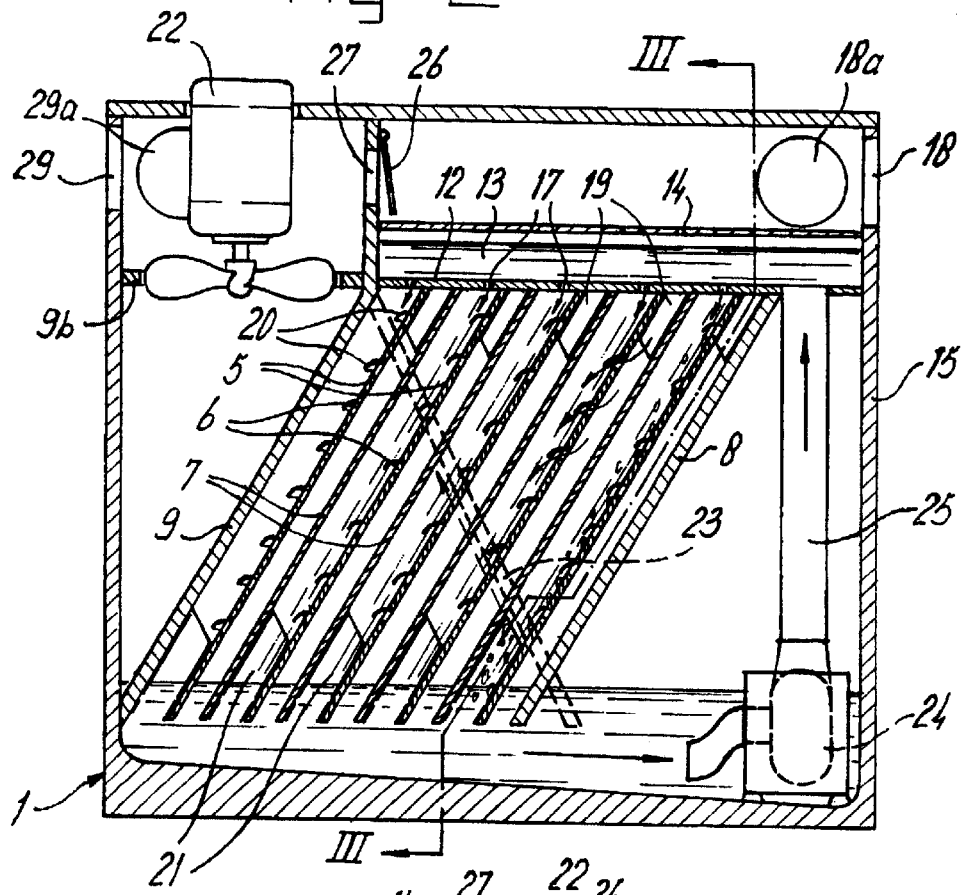
FIG. 2 shows a longitudinal section through this device.
Figure 3:
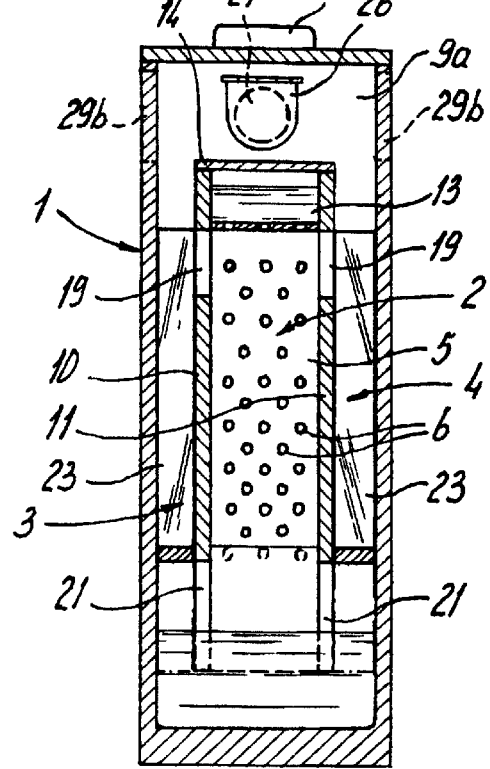
FIG. 3 shows a cross-section on line III—III in FIG. 2.

The device shown in FIG. 1, which is intended to bring a gas and a liquid into intensive contact with one another, comprises at least one box 1 with three chambers located next to one another, namely a central chamber 2 flanked by two side chambers 3 and 4 (cf. FIG. 3).

A set of inclined plates, comprising alternately plates 5 with openings 6 and closed plates 7, is accommodated in the central chamber 2. The set of plates is positioned between inclined walls 8 and 9 and is covered at both sides by side walls 10 and 11.

The top edges of the inclined plates 5 and 7 are covered by the bottom 12 of a liquid-supply channel 13, into which is introduced liquid which is to be brought into contact with the gas. The liquid channel 13 is bounded at the sides by the side walls 10 and 11, at the ends by the walls 15 and 9a, and at the top is covered by a cover 14.

Openings 17 for the passage of liquid, via which liquid present in the liquid-supply channel 13 can flow over the upper surface of the plates 5, are made in the bottom 12 of the channel 13, slightly above the edge of the inclined plates 5 which are provided with openings 6.

Via openings 18, 18a and 18b in the side walls of the box 1, gas can flow into the side chambers 3 and 4, and then, via the openings 19 in the side walls 10 and 11 of the chamber 2, can flow into the top part of the spaces beneath the inclined plate 5 which is provided with openings 6 and above the closed, inclined plates 7 and, from there, can pass via the openings 6 in the inclined plates 5 into the film of liquid which is flowing downwards along the upper surface of the inclined plates 5.

An important aspect of the invention is that channels or diverter elements 20, which guide the gas in the direction of the flow of liquid. are connected to the gas-passage openings 6 in the inclined plates 5. The channels or diverter elements 20 open out entirely into the stream of liquid, in such a manner that a venturi effect is produced, i.e. subatmospheric pressure is generated at the location where they open out. The result is that the gas is drawn into the liquid under atmospheric conditions or at a very slightly superatmospheric pressure. As a result of the low gas pressure, elongate, thin gas bubbles are formed in the flowing film of liquid, which bubbles take some time to break out at the surface of the liquid and have a relatively large contact area with the liquid. The distance over which these gas bubbles are entrained by the stream of liquid is relatively long. The contact between gas and liquid is improved considerably by comparison with systems in which gas is blown through openings in an inclined surface into a film of liquid at superatmospheric pressure, in a direction which is essentially perpendicular to the film of liquid.

When using the invention, a low power consumption is achieved. An additional advantage is that the openings 6 are covered by the downwardly directed channels or diverter elements 20 and liquid cannot penetrate into the openings 6.

Preferably, the channels or diverter elements 20, or at least the areas where they open out, are produced from or covered with a water-repelling (hydrophobic, or at least non-hydrophilic) material. As a result, the resistance which the gas undergoes, as a consequence of adhesion forces between liquid and the said material, when it flows into the liquid is reduced.

Figure 4:
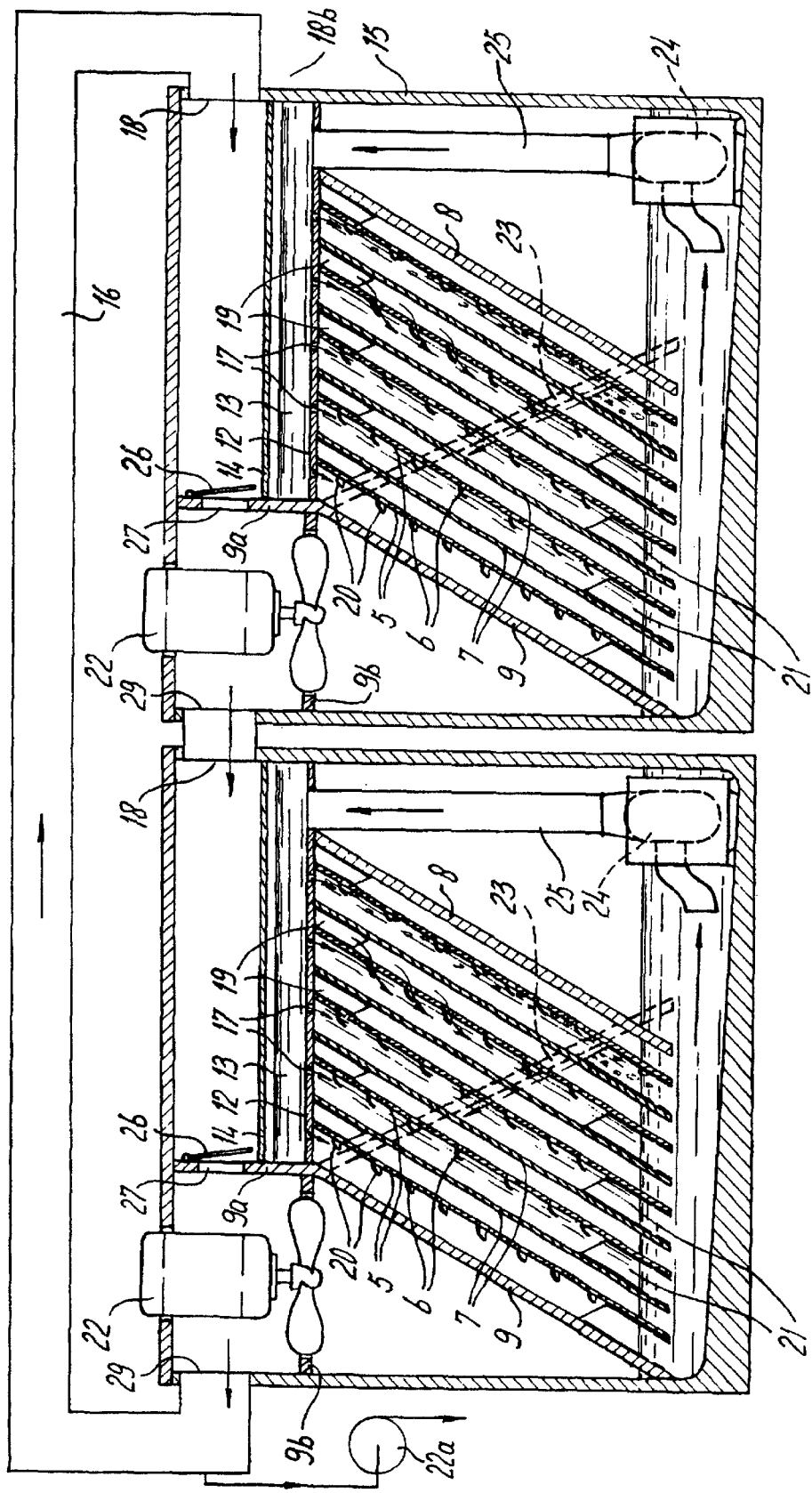
FIG. 4 shows two devices connected one behind the other.

FIG. 4 shows a longitudinal section through two devices which are connected one behind the other, evaporation of the liquid taking place at elevated temperature in the right-hand device and condensation of the liquid taking place at reduced pressure in the left-hand device. The gas to be discharged from the right-hand device by means of the ventilation device 22 is fed into the left-hand device via the opening 29 of the right-hand device and opening 18b of the said left-hand device, and the gas to be discharged from the left-hand device is returned, via a pipe 16 and the opening 18, to the space above the liquid-supply channel 13 of the right-hand device, and is then recirculated through the film-like streams of liquid via the openings 19, 6 and 21, so that evaporation and condensation take place in a continuous process. The liquid level in the bottom of the right-hand device will fall and that in the left-hand device will rise. Means (not shown) will be present in order to keep the liquids present at the bottom in both devices essentially at the initial level. It is also possible to position two or more devices in series next to one another, an opening 18a or 18b of one device being aligned with a lateral opening 29a at the location of the ventilator 22 of a following device. This means that successive devices are alternately rotated through 180°.

Figure 5:
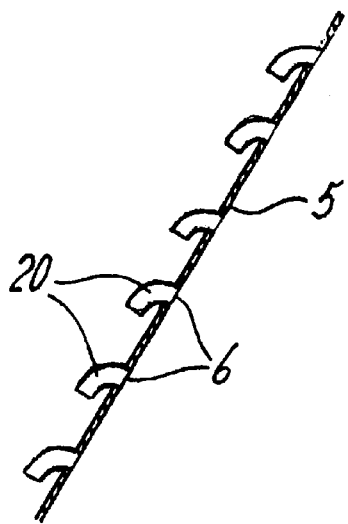
FIGS. 5 and 6 show different designs of the channels or diverter elements which are connected to the openings and are situated on those sides of the walls which are in contact with the liquid.
Figure 6:
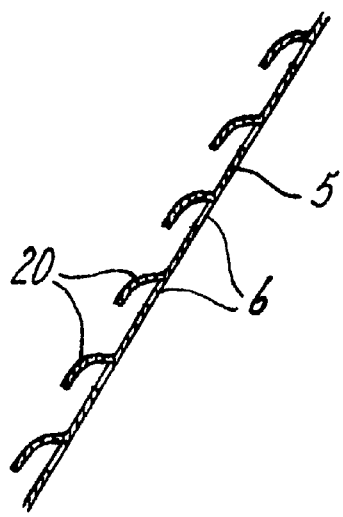

FIGS. 5 and 6 show two embodiments of channels or diverter elements 20 which are connected to the openings 6.

A second important aspect of the invention is that the gas which is supplied to the liquid and the gas which has been in contact with the stream of liquid are separated from one another in an efficient manner, with the aid of a water seal.

The bottom strips of the inclined plates 5 and 7 and the walls 8 and 9 project a few centimetres into the liquid which is situated on the bottom of the box 1. Openings 21, which place the spaces above the inclined plates 5 which are provided with openings 6 and below the closed, inclined plates 7 in communication with the chambers 3 and 4, are arranged at the bottom in the side walls 10 and 11 of the central chamber 2. The liquid at the bottom of the box 1 acts as the abovementioned water seal. The mixture of gas and liquid flowing off the inclined plates 5 separates itself in the reservoir of liquid at the bottom of the box 1, and the vapour-saturated gas liberated is drawn via the opening 21 towards a ventilator 22 and discharged to atmosphere or to an identical device connected in series for bringing gas and liquid into contact with one another.

The ventilator 22 only needs to generate a pressure difference of between a few millimetres and a few centimetres water column, and consequently the liquid at the bottom of the box 1 only has to be at a level a few centimetres above the bottom edge of the plates 5 and 7 and the walls 8 and 9. In each of the chambers 3 and 4, on either side of the chamber 2, there is arranged a wall 23, the bottom edge of which likewise projects a few centimetres into the liquid at the bottom of box 1, which wall 23 separates that part of these chambers 3 and 4 which is in communication with the openings 21 from those parts of the chambers 3 and 4 which are in communication with the openings 19.

Liquid which has accumulated on the bottom of the box 1 can be recycled, via a pump 24 and a line 25. to the liquid-supply channel 13 above the inclined plates 5 and 7.

Furthermore, the device is provided with a valve 26 which is controlled by the gas pressure and makes it possible, if necessary, to recirculate some of the gas through the film-like stream of liquid after it has passed from the ventilator 22 via opening 27 and the side chambers 3 and 4.

FIG. 3 shows a cross-section through a box 1. A plurality of the boxes can be connected in parallel or in series with one another in a simple manner by making use of the connecting openings 18, 18a, 18b and 29, 29a and 29b.

Due to the fact that the liquid is guided from the same level over the inclined plates 5 which are provided with openings 6, these plates 5 all receive substantially the same quantity of liquid. The inclined plates 5 and 7, as well as the walls 8, 9, 10, 11 and 23, project a few centimetres into the liquid channel at the bottom of the tank 1, thus achieving excellent separation between supply gas and discharge gas. The introduction of the gas into the film of liquid, in the direction of flow of the latter, and the venturi effect lead to a large contact area between the long gas bubbles and the film of liquid.

The space above the liquid channel 13 is separated from the space in which the ventilator 22 acts by means of the extensions 9a and 9b at the top end of the wall 9. An opening 27, which is closed off by a non-return valve 26, is arranged in the extension 9a, with the result that, depending on the gas pressure, some of the gas can flow back towards openings 19.

Figure 7:
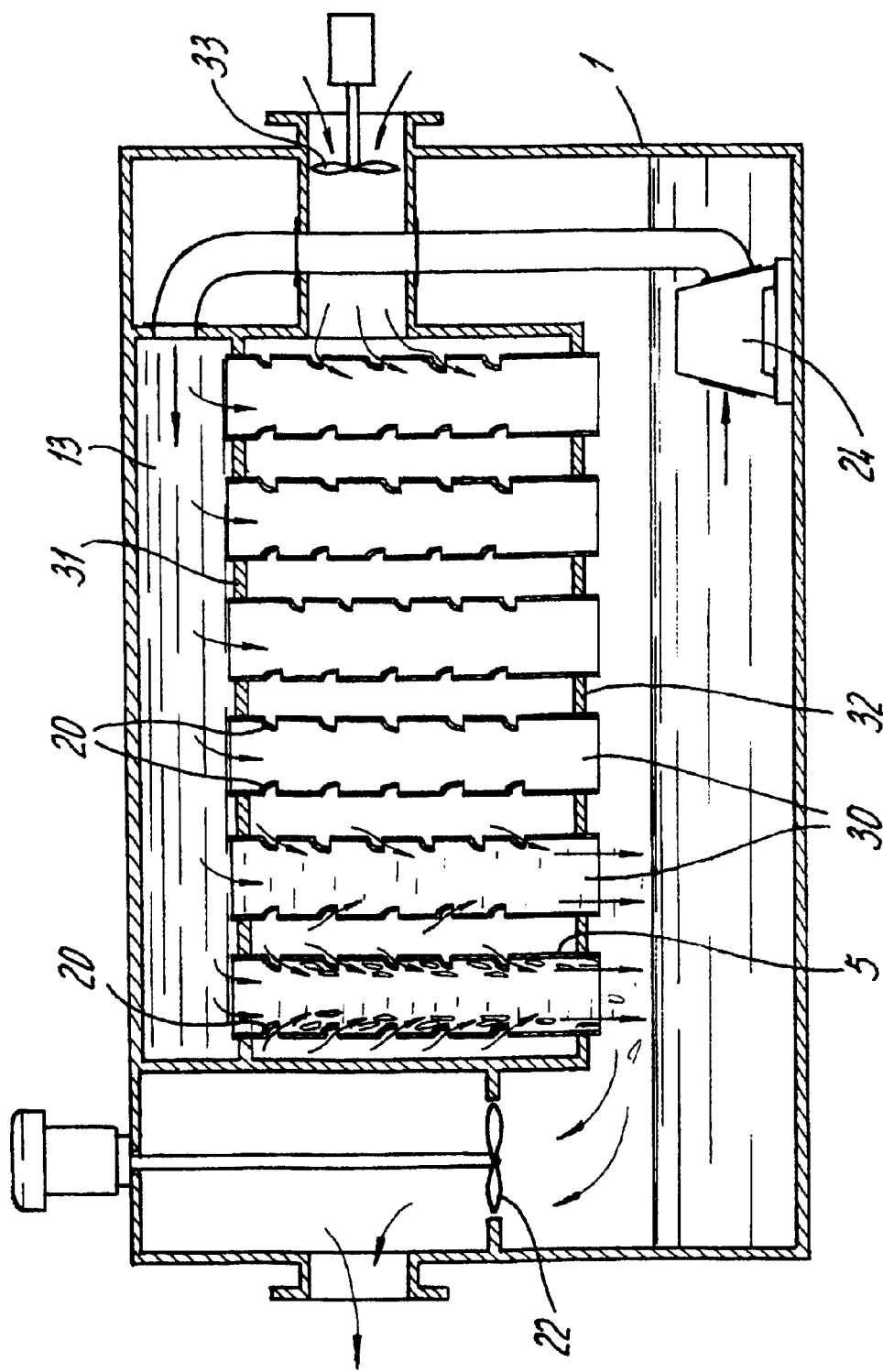
FIG. 7 shows a second embodiment of the device, in which diverter elements, in the form of louvred perforations, are arranged in the walls of vertically disposed tubes.

In the second embodiment in accordance with FIG. 7, the diverter elements 20, which are designed as louvred perforations, are arranged in the wall 5 of one or more vertically disposed tubes 30 which are situated between two tube plates 31, 32. At the top, the tubes 30 are in communication with a liquid-supply channel 13 which is filled with liquid and is provided with liquid by means of the pump 24. The liquid flows downwards through the tubes 30, in which process, as a result of the direction and the shape of the louvred perforations 20 arranged in the tube wall subatmospheric pressure is produced in this opening and gas is drawn, via the space between the tubes, into the stream of liquid by the louvred perforations as long, thin bubbles. At the bottom of the tubes, the mixture of gas and liquid formed falls into the bottom part of the box 1, where it becomes separated, after which the liquid is returned, by means of liquid pump 24, to the liquid-supply channel 13 situated above the tubes, while the gas is discharged by means of the ventilator 22. A ventilator 33 may also be situated in the gas-supply opening for the purpose of supplying the gas.

Figure 8:
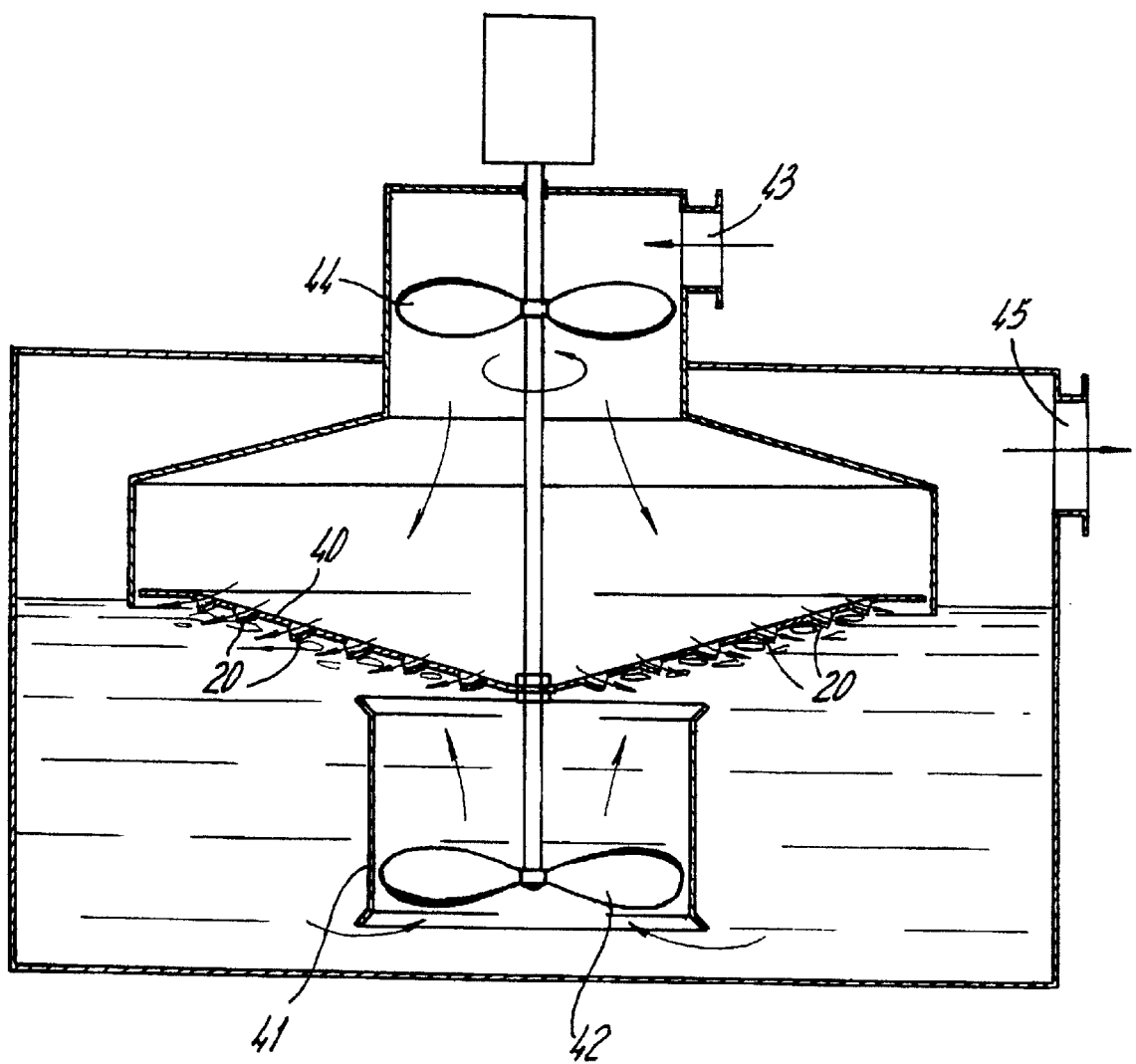
FIG. 8 shows a third embodiment, in which the louvred perforations are arranged in a disc which rotates along the surface of the liquid.

The third embodiment in accordance with FIG. 8 has louvred perforations 20 which are arranged in a thin-walled, conical disc 40, which is in contact with liquid, and are directed in such a manner that the rotating movement of the disc 40 past the liquid which is in contact with its underside produces a subatmospheric pressure in the louvred openings 20, with the result that gas flows into the liquid and is mixed with the latter as long, thin bubbles. In this case, the liquid can be supplied to the disc, from the underside of the reservoir 1, via a tube 41, by means of a vane or pump 42. If necessary the gas can be supplied by a ventilator vane 44 and, after separation, is discharged through the opening 45.

In case of two devices which are connected in series (FIG. 4) and which consist successively of an evaporator and a condenser, it is preferred to connect a vacuum pump 22a to the system closed off from the atmosphere. The vacuum pump is able to reduce the quantity of air in the circulating vapour-air mixture.

What is claimed is:

1. A device for causing contact between a gas and a liquid, comprising:
   (a) a first chamber having two parallel wall members with a plurality of inclined wall members arranged transversely between said two parallel wall members to separate the gas and liquid into a gas region and a liquid region wherein alternating wall members of said plurality of wall members have a plurality of openings;
   (b) a plurality of guide members located on the sides of said alternating wall members being adjacent to the liquid region, said guide members having inlets disposed on said openings on said alternating wall members and outlets extending into the liquid region, wherein relative movement between the liquid and the wall member causes a venturi-effect at the outlets drawing gas from the gas region through the openings in said alternating wall members, said guide members directing the gas drawn through the openings into the liquid region in a direction corresponding to the direction of movement of the liquid with respect to the wall member to form elongated gas bubbles in the liquid;
   (c) a plurality of openings in at least one of said parallel wall members, said openings being disposed in the gas regions for supplying gas to the gas regions; and
   (d) a plurality of openings in at least one of said parallel wall members, said openings being disposed in the liquid regions, said openings providing an outlet for gas and liquid from the liquid regions, said openings being adjacent to a second chamber for receiving the outlet gas and liquid, said second chamber partially filling with liquid to form a liquid seal during operation.

2. A device as in claim 1, wherein a gas-removal device is connected to said second chamber.

3. A device as in claim 1, wherein the liquid is supplied to said liquid regions at an elevated portion of said regions.

4. A device as in claim 1, wherein the liquid is supplied from a liquid supply channel extending adjacently above said plurality of inclined wall members, said channel having openings positioned above said liquid regions permitting liquid to flow into said liquid regions.

5. A device as in claim 4, wherein liquid from said second chamber is fed to said liquid supply channel.

6. A device as in claim 1, wherein the first chamber is fed gas from a gas supply.

7. A device as in claim 5, wherein said second chamber further comprises a gas pressure valve and connection with said first chamber wherein said gas pressure valve opens upon excess gas pressure in the second chamber and releases gas to said first chamber.

8. A device as in claim 7, further comprising gas discharge lines from said second chamber and gas supply lines to said first chamber wherein said lines are used for connecting like devices in series and/or parallel.

9. A device as in claim 8 being connected to another device in series, further comprising an evaporator unit, a condenser unit and a vacuum pump.

10. A device as in claim 1, wherein said liquid is in motion in the liquid regions with respect to the alternating wall members.

11. A device for causing contact between a gas and a liquid, comprising:
   (a) at least one chamber having a gas inlet, a liquid inlet and at least one wall member with a first face and opposing second face, wherein said wall member separates the chamber into gas and liquid regions, said gas inlet supplying gas to said gas region and said liquid inlet supplying liquid to said liquid region such that said first face contacts the gas in said gas region and said second face contacts the liquid in the liquid region, said wall member having a plurality of openings therein; and
   (b) a plurality of guide members having inlets disposed on the openings on said second face of said wall member and outlets protruding into the liquid region, wherein relative movement between the liquid and the wall causes a venturi effect at the outlets, providing subatmospheric pressure at the outlets and drawing the gas from the gas region through the openings, said guide members directing the gas drawn through the openings into the liquid region in a direction corresponding to the direction of movement of the liquid with respect to the wall member to form elongated gas bubbles in the liquid.

12. A device as in claim 11, wherein said wall member moves with respect to the liquid in the liquid region.

13. A device as in claim 11, wherein said liquid in the liquid region moves with respect to the wall member.

* * * * *